(12) United States Patent
Rutherford et al.

(10) Patent No.: US 7,574,920 B2
(45) Date of Patent: Aug. 18, 2009

(54) TIRE PRESSURE GAUGE WITH SENSOR SUPPORT

(76) Inventors: Robert B. Rutherford, 5 Shady Oaks Dr., Folsom, CA (US) 95630; Mike Levenson, 25 Yale Rd., Pembroke, MA (US) 02359

( * ) Notice: Subject to any disclaimer, the term of this patent is extended or adjusted under 35 U.S.C. 154(b) by 170 days.

(21) Appl. No.: 11/335,016

(22) Filed: Jan. 18, 2006

(65) Prior Publication Data
US 2007/0113666 A1 May 24, 2007

Related U.S. Application Data

(60) Provisional application No. 60/645,278, filed on Jan. 18, 2005.

(51) Int. Cl.
*G01L 7/04* (2006.01)
(52) U.S. Cl. .......................... 73/732; 73/146
(58) Field of Classification Search ........ 73/148–148.6, 73/700–756
See application file for complete search history.

(56) References Cited

U.S. PATENT DOCUMENTS

| | | |
|---|---|---|
| 3,789,867 A | 2/1974 | Yabor |
| 3,873,965 A | 3/1975 | Garcia |
| 3,969,936 A | 7/1976 | Lindsay |
| 3,990,309 A | 11/1976 | Beckwith |
| 4,051,803 A | 10/1977 | Arnone |
| 4,248,080 A | 2/1981 | Chuck |
| 4,270,568 A | 6/1981 | Gray |
| 4,279,161 A | 7/1981 | Huston |
| 4,606,391 A | 8/1986 | Achterholt |
| 4,619,137 A | 10/1986 | Bott |
| 4,723,445 A | 2/1988 | Ripley |
| 4,763,516 A | 8/1988 | Greenspan |
| 4,773,270 A | 9/1988 | Ogasawara |
| 4,924,697 A | 5/1990 | Hunt |
| 4,953,395 A | 9/1990 | Jard |
| 4,970,491 A | 11/1990 | Saint |
| 5,040,562 A | 8/1991 | Achterholt |
| 5,357,242 A | 10/1994 | Morgano |
| 5,365,967 A | 11/1994 | Moore |
| 5,377,539 A * | 1/1995 | LaSalle ..................... 73/146.8 |
| 5,503,012 A | 4/1996 | Rabizadeh |
| 5,694,111 A | 12/1997 | Huang |

(Continued)

OTHER PUBLICATIONS

Spiragage Plus product description.

*Primary Examiner*—Edward Lefkowitz
*Assistant Examiner*—Jermaine Jenkins
(74) *Attorney, Agent, or Firm*—Heisler & Associates

(57) ABSTRACT

A pressure gauge is provided for monitoring pressure within a reservoir, such as air within a vehicle tire. The gauge is particularly configured to allow it to remain upon a valve stem of the tire even when the tire is in operation. A receiver of the gauge can be coupled to the valve stem. A valve core is preferably provided through which air can pass from a compressed air source, so that the tire can be filled without removing the gauge. A Bourdon tube is located within a sensor chamber and measures pressure within the reservoir. A shroud or other support surface is located adjacent a central opening of the Bourdon tube so that the Bourdon tube is supported sufficiently to avoid damage from forces including centrifugal forces encountered when the tire is spinning and the gauge is mounted on the valve stem of the tire.

12 Claims, 4 Drawing Sheets

U.S. PATENT DOCUMENTS

| | | |
|---|---|---|
| 5,965,822 A | 10/1999 | Wu |
| 6,085,595 A | 7/2000 | Ferguson |
| 6,119,525 A | 9/2000 | Hamma |
| 6,843,115 B2 | 1/2005 | Rutherford |
| 7,040,152 B2 * | 5/2006 | Rutherford ................... 73/146 |
| 7,237,439 B1 * | 7/2007 | Rutherford et al. ............ 73/732 |
| 7,251,994 B2 * | 8/2007 | Maldonado et al. ........ 73/146.8 |
| 7,284,419 B2 * | 10/2007 | Rutherford ................. 73/146.8 |

* cited by examiner

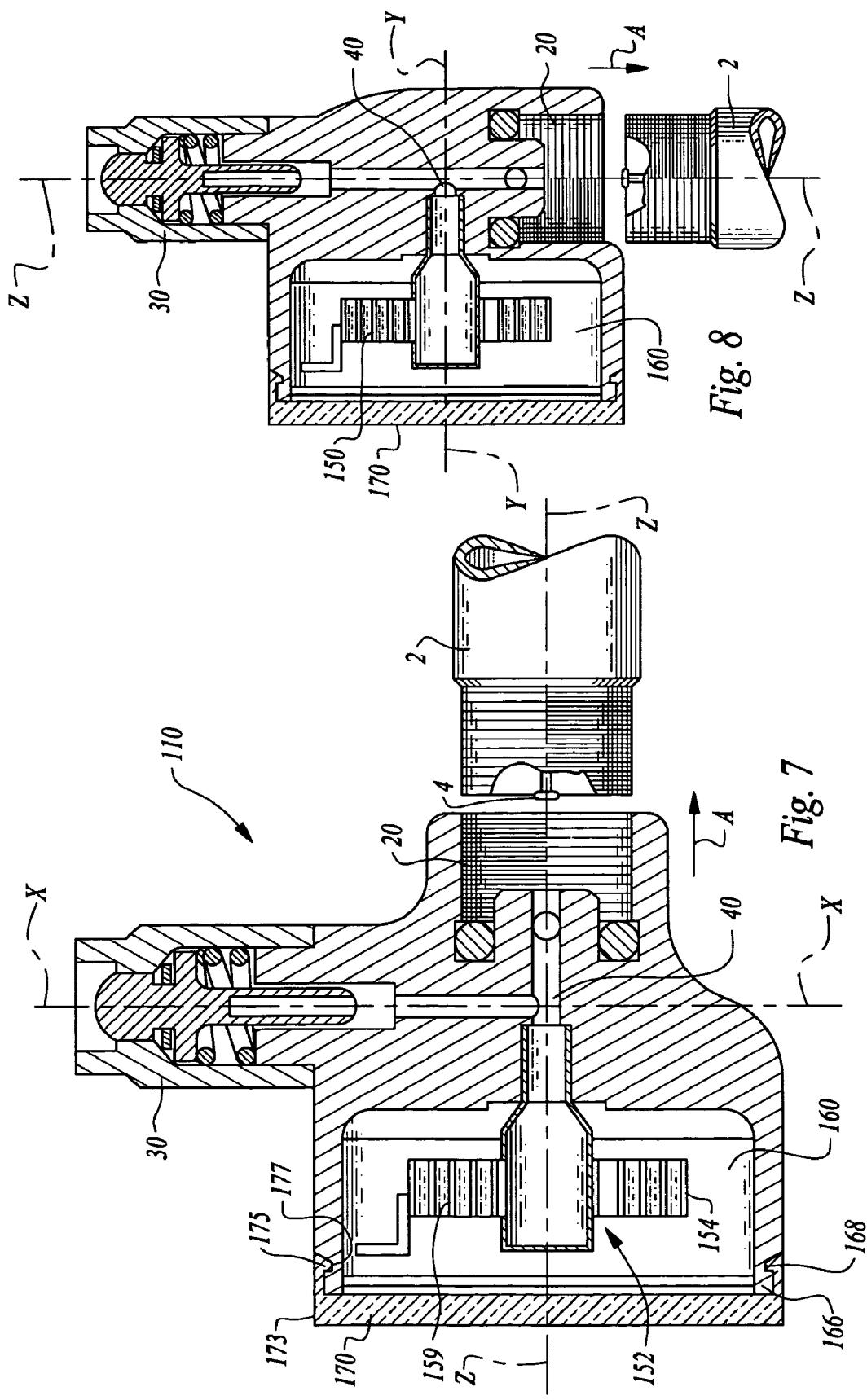

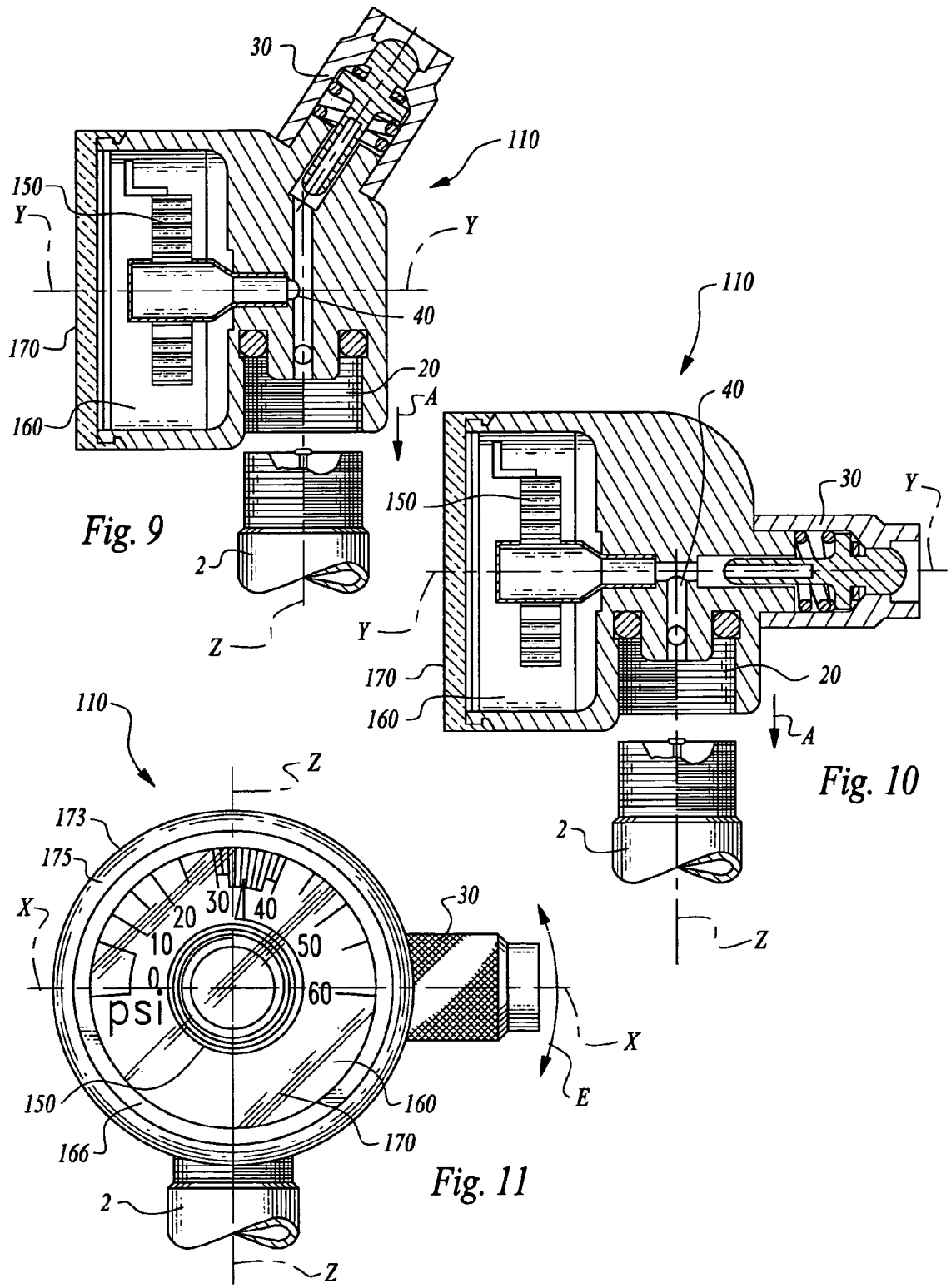

TIRE PRESSURE GAUGE WITH SENSOR SUPPORT

CROSS-REFERENCE TO RELATED APPLICATIONS

This application claims benefit under Title 35, United States Code § 119(e) of U.S. Provisional Application No. 60/645,278 filed on Jan. 18, 2005.

FIELD OF THE INVENTION

The following invention relates to pressure gauges, and particularly pressure gauges for measuring tire pressure. More specifically, this invention relates to tire pressure gauges which are configured to remain mounted upon a valve stem of a tire while the tire is in operation on the vehicle, with a pressure sensing Bourdon tube supported so that it does not become de-calibrated or otherwise damaged by the forces associated with operation of the tire.

BACKGROUND OF THE INVENTION

One important criteria for safely operating a motor vehicle is the maintenance of proper pressure within tires of the vehicle. If tire pressure is not maintained, fuel economy is adversely affected and rates of tire wear increase. Additionally, handling of the vehicle can be adversely affected and the potential for abrupt failure of the tire is increased. Hence, it is advisable to monitor the pressure within vehicle tires on a regular basis.

One of the difficulties encountered in such regular tire pressure monitoring is that a significant amount of time is associated with monitoring tire pressure. In particular, a safety cap must be removed from the valve stem (and not misplaced). The gauge must be placed upon the valve stem of the tire. Care must be taken to make sure that a significant amount of air is not lost from the tire during this gauge installation process. The pressure can then be read from the gauge. If the tire pressure is adequate, the procedure is completed for that tire and the next tire can be checked. On a vehicle with multiple tires, this basic routine can be significantly time consuming, decreasing the likelihood that tire pressure monitoring will occur on a sufficiently frequent basis.

Compounding this difficulty is the inconvenience encountered when tire pressure is low and air needs to be added to the tire. First the gauge is removed. Then the vehicle is brought into proximity with a source of compressed air. Then compressed air is added to the tire. Unless an accurate gauge is associated with the source of compressed air, the source of compressed air must be removed after a relatively short period of time and the pressure gauge reinserted on the valve stem to take another reading. Typically, a half a dozen or so filling steps and measuring steps are involved before the tire pressure has been brought to the proper level.

It is known in the prior art to provide tire pressure gauges which are mountable upon a valve stem and which are sufficiently small and lightweight that they can remain mounted to the tire during operation of the tire. While this solves a portion of the problem, the difficulty associated with adding air to the tire is not alleviated. In at least two prior art patents, tire pressure gauges are taught which further allow for a source of compressed air to pass into the valve stem of the tire while the gauge remains upon the valve stem. In particular, U.S. Pat. No. 5,377,539 to LaSalle and U.S. Pat. No. 4,924,697 to Hunt (each incorporated herein by reference in their entirety) disclose tire pressure gauges which can mount on a valve stem of a tire and which also include a port through which compressed air can be added without removing the tire pressure gauge.

The tire pressure gauges taught by LaSalle and Hunt are not entirely satisfactory. In particular, in the case of LaSalle the fill port passes through a center of a face which is read to determine the pressure of the tire. A Bourdon tube supporting an indicator is wrapped around this fill tube. To accommodate this fill port passing through a center of the Bourdon tube, a customized Bourdon tube is required which significantly complicates the manufacture of the gauge taught by LaSalle. Also, reading the pressure indicated by the Bourdon tube is made more difficult by the presence of a valve core in a middle of a face of the gauge.

In the case of the device taught by Hunt, the fill port is provided separate from the face of the gauge. However, the spiraling Bourdon tube is not fully supported for the extreme operating environment experienced when the Hunt gauge remains mounted upon the tire, and as the tire is rotating at high speed, such as when the vehicle is in operation. These rotational forces impart a high degree of centrifugal force upon the Bourdon tube, tending to exceed an elastic limit of the materials and/or induce creep into the materials from which the Bourdon tube is formed, and potentially bringing the Bourdon tube out of proper calibration. The Bourdon tube is particularly susceptible to damage in that it must purposefully be made of sufficiently thin material to allow it to flex in response to pressure changes. Thus, over time the gauge taught by Hunt has a potential to become less accurate.

In attempting to compensate for this tendency, added complexity, added weight and other negative attributes can become necessary to implement the invention taught by Hunt. Accordingly, a need exists for a tire pressure gauge which can remain upon a tire and which includes an appropriate support surface to help to keep the Bourdon tube from being flexed out of an original position when the gauge is experiencing centrifugal forces and other forces associated with rotating along with a tire upon which the Bourdon tube and associated gauge are mounted.

SUMMARY OF THE INVENTION

With this invention a tire pressure gauge is provided which can remain mounted upon a valve stem of a tire during operation of the tire, and maintain proper calibration and function in spite of forces encountered while rotating along with the tire.

The gauge is contained within a housing which includes a receiver which is particularly configured to allow it to be securely attached to a valve stem on the tire, or some other compressed fluid reservoir which is to have its pressure monitored. The entire gauge is supported by the valve stem or other support through the receiver in the preferred embodiment of this invention.

The gauge also preferably (but not completely necessarily) also includes a valve core through which compressed air or other fluid can be added into the valve stem. This valve core is in communication with the receiver so that compressed fluid added through the valve core can pass through the receiver and into the valve stem or other structure leading to the compressed fluid reservoir to which the gauge is mounted.

A pressure sensor is provided in the form of a Bourdon tube. The Bourdon tube is operatively coupled to the receiver so that compressed air or other fluids from the valve stem are fed into the Bourdon tube. The Bourdon tube is thus caused to "de-spiral" an amount proportional to the pressure differential between an exterior of the Bourdon tube and an interior of the Bourdon tube.

The Bourdon tube preferably resides within a sensor chamber covered and typically sealed by a lens and with indicia either upon the lens or a portion of the sensor chamber such that a sensor tip on the Bourdon tube can be aligned with the indicia to read the pressure contained within the compressed fluid reservoir associated with the valve stem. Some form of support surface, such as a shroud, is located within the sensor chamber and adjacent the Bourdon tube, and particularly a central opening of the Bourdon tube. This support surface keeps the Bourdon tube from being bent laterally when the entire gauge, including the Bourdon tube, is experiencing centrifugal forces or other forces associated with the compressed fluid reservoir (such as a tire) spinning at a high rate of speed, encountering bumps, or otherwise experiencing extreme forces. This support surface minimizes an amount of bending and associated stress and strain encountered by the Bourdon tube, keeping this stress and strain within allowable limits so that the Bourdon tube remains in proper calibration and continues to maintain proper function. In particular, the Bourdon tube can be loaded in a manner which causes unwinding of a coil of the Bourdon tube or tightening of the coil of the Bourdon tube (depending on the direction of rotation of the valve stem and the direction of spiral of the coil of the Bourdon tube). With this invention, the shroud or other support surface provides a solid and uniform support against which the Bourdon tube coil can tighten without damage or de-calibration, with the direction of spiral properly selected to avoid unwinding.

OBJECTS OF THE INVENTION

Accordingly, a primary object of the present invention is to provide a tire pressure gauge which can remain mounted upon a tire during operation of the tire.

Another object of the present invention is to provide a tire pressure gauge which resists distortion or other damage when experiencing high centrifugal force environments and other high load environments.

Another object of the present invention is to provide a tire pressure gauge including a Bourdon tube and which keeps the Bourdon tube from becoming damaged even when the gauge remains on the tire during operation of the tire.

Another object of the present invention is to provide a pressure gauge which includes a valve core through which compressed fluid can be added so that the pressure gauge can remain upon a valve stem of a compressed fluid reservoir (such as a tire) during adding of compressed fluid into the reservoir.

Other further objects of the present invention will become apparent from a careful reading of the included drawing FIGS., the claims and detailed description of the invention.

BRIEF DESCRIPTION OF THE DRAWINGS

FIG. 7 is a full sectional view similar to that which is shown in FIG. 1 but depicting an alternative embodiment. This alternative embodiment includes a unique lens and a unique Bourdon tube when compared to the lens and Bourdon tube of the embodiment of FIG. 1.

FIGS. 8-10 are full sectional views of the gauge of FIG. 7 but with the receiver and valve core provided with various different orientations which illustrate the different orientations which can be exhibited by the valve core and receiver according to this invention.

FIG. 11 is a front elevation view of a further variation in orientation of the valve core and receiver, with the valve core in this orientation having been rotated about a centerline of a face of the valve relative to how the valve core is oriented in FIG. 8.

DESCRIPTION OF THE PREFERRED EMBODIMENT

Figure 1:
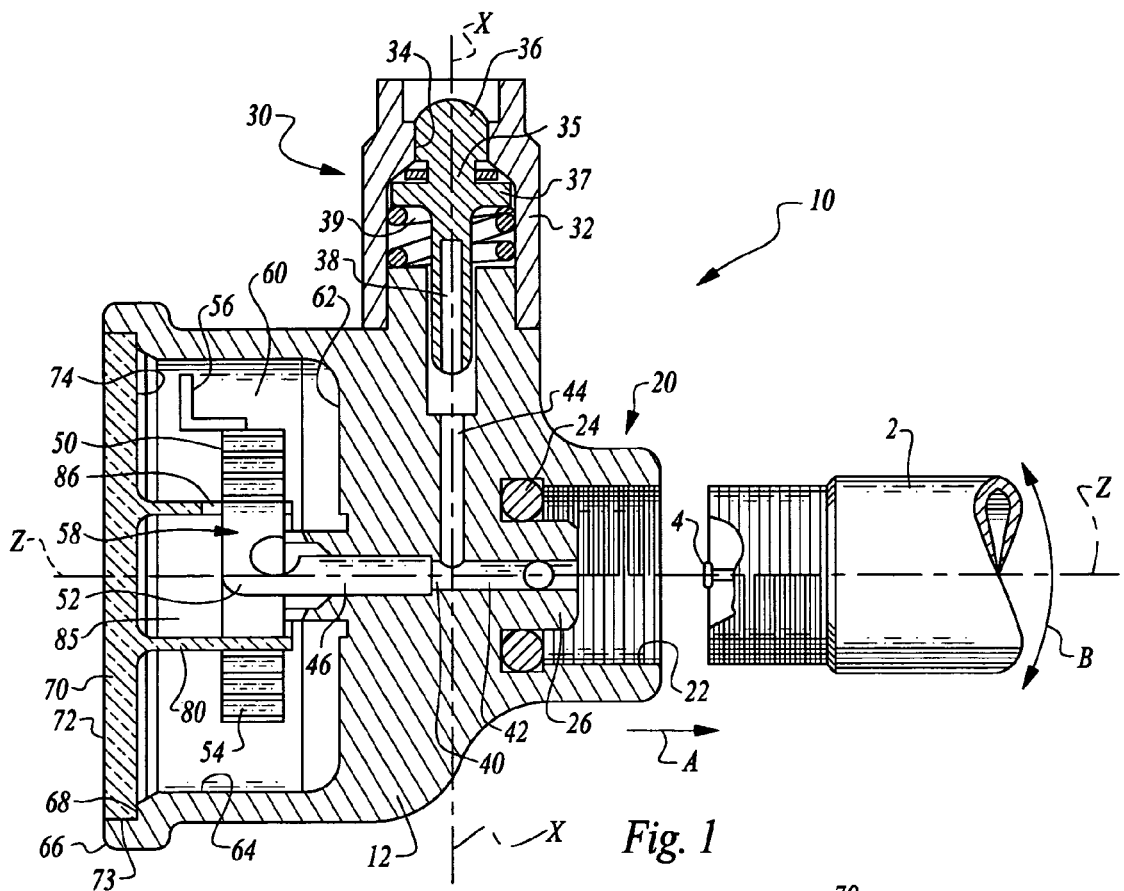
FIG. 1 is a full sectional view of a preferred embodiment of the gauge of this invention located adjacent a valve stem to which the gauge can be mounted.

Referring to the drawings, wherein like reference numerals represent like parts throughout the various drawing FIGS., reference numeral 10 is directed to a gauge (FIGS. 1 and 2) which is particularly configured to measure pressure, and particularly the pressure within tires. The gauge 10 is configured to be mountable to a valve stem 2 of the tire with the gauge capable of remaining upon the valve stem 2 during operation of the tire without the gauge experiencing permanent damage due to the forces associated with rapid rotation and other forces encountered by a tire during vehicle operation.

In essence, and with particular reference to FIG. 1, basic details of the gauge 10 of this invention are described according to a preferred embodiment. The gauge 10 includes a receiver 20 which is particularly configured to be mountable to the valve stem 2 of a compressed fluid reservoir such as a tire. A valve core 30 is optionally but preferably also included on the gauge 10. The valve core 30 is in fluid communication with the receiver and acts as a port through which compressed fluid (typically air) can be routed into the tire (or other compressed fluid reservoir) through the receiver 20 and valve stem 2. A junction 40 defines an interior location within the gauge 10 where the valve core 30 and receiver 20 are joined for fluid flow therebetween.

Bourdon tube 50 acts as a pressure sensor for the gauge 10 and is also in communication with the receiver 20, preferably through the junction 40. The Bourdon tube 50 is mounted within a sensor chamber 60 so the Bourdon tube 50 expands or contracts appropriately depending on the pressure of the fluid within the tire (or other compressed fluid containing reservoir) associated with the valve stem 2. A lens 70 encloses one side of the sensor chamber 60. The lens 70 is at least partially transparent allowing the Bourdon tube 50 to be seen along with indicia 76 which are calibrated along with the Bourdon tube 50 so that the indicia 76 accurately display pressure for the gauge 10.

In a most preferred form of this invention, the lens 70 includes a shroud 80 extending into a central opening of the Bourdon tube 50. The shroud 80 acts to support the Bourdon tube to minimize forces, including centrifugal forces, which might otherwise damage the Bourdon tube 50. As an alternative to the shroud 80, an alternative Bourdon tube 150 (FIG. 7) can be provided which includes a central tower 152 which extends up from a floor of the sensor chamber 160 and similarly provides support for the Bourdon tube 50, so that forces associated with a rotating tire or other excessive forces do not damage the Bourdon tube 150.

More specifically, and with particular reference to FIG. 1, details of the valve stem 2 or other port associated with the tire or other compressed fluid reservoir, are described. While the gauge 10 of this invention could be utilized on a variety of different compressed fluid reservoirs, most typically it is anticipated that the gauge 10 would be utilized on vehicle tires. Vehicle tires typically include a valve stem 2 which is an elongate cylindrical structure extending from a portion of the tire or a rim of a wheel upon which the tire is mounted, or from an inner tube located within the tire.

This valve stem 2 acts as a port accessing an interior of the space in which the compressed air or other compressed gas or other fluid is located. A pin 4 is typically associated with the valve stem 2. This pin 4 is coupled to a valve within the valve stem 2. In particular, when the pin 4 is depressed, the valve is opened and fluids within the tire are able to escape. When the gauge 10 of this invention is placed upon the valve stem 2, the pin 4 is depressed and air or other fluids within the tire are allowed to pass into the gauge 10 and in particular to communicate with the Bourdon tube 50, so that the Bourdon tube 50 can properly measure the pressure of the fluid within the tire.

With continuing reference to FIG. 1, specific details of the housing 12 of the gauge 10 and fluid input and output structures of the gauge 10 are described according to a preferred embodiment. The entire gauge 10 is formed within a housing 12 which is preferably a unitary mass of material into which the various different parts of the gauge 10 are formed. This mass of material is typically a sufficiently high density and high strength plastic to resist the pressure differentials between an exterior of the housing 12 and interior pathways for the compressed fluid within the gauge 10. By making the housing 12 of a lightweight polymeric hydrocarbon plastic, a weight of the gauge 10 is minimized, such that balance of the tire is not adversely affected (or easily compensated) when the gauge 10 is on the valve stem 2.

The housing 12 is most preferably injection molded to include many of the structural features of the housing 12. Other portions of the housing 12 can then be machined in additional processes or all of the various pathways within the housing 12 can be formed as part of the injection molding process, provided the mold has sufficient complexity and geometric features to provide all of the necessary pathways and contours. Furthermore, subassemblies such as the valve core 30 and the Bourdon tube 50 and lens 70 can be subsequently mounted to the housing 12 to complete the gauge 10.

The receiver 20 is formed on a portion of the housing 12 and acts as an inlet port sized and shaped so that it can mount securely over the valve stem 2 (by movement along arrow A of FIG. 1) on which the gauge 10 is intended to be utilized. This receiver 20 is essentially a blind bore having a cylindrical wall 22 extending into the housing 12. This cylindrical wall 22 can be threaded with threads that are designed to be complemental with threads on the valve stem 2. Alternatively, the cylindrical wall 22 can be formed of a resilient liner such as a soft rubber or other material which can maintain a pressure tight seal without requiring threads.

An O-ring 24 or fiber washer or similar gasket is oriented within an interior of the receiver 20 and surrounding a nose 26 which extends along a centerline of the receiver 20 and toward an opening of the receiver 20 somewhat. This nose 26 is particularly adapted to depress the pin 4 of the valve stem 2 so that the valve stem 2 has its valve open when the valve stem 2 has been inserted entirely into the receiver 20. A port also passes through the nose 26 so that air or other fluids from the valve stem 2 can pass into the gauge 10 through the receiver 20.

The valve core 30 is spaced from the receiver 20 but has an interior thereof in communication with the receiver 20. The valve core 30 is optionally a structure separate from the housing 12 which can be press fit, bonded or otherwise attached to the housing 12 during manufacture. Preferably, at least portions of the valve core 30 are formed with the housing 12. The valve core 30 generally has a structure similar to that of the valve stem 2, except that it is coupled to the gauge 10 permanently. Furthermore, the valve core 30 can alternatively be configured so that a valve thereof opens merely when a source of high pressure fluid is coupled thereto, or can be configured to require a form of pin to depress a valve 35 within the valve core 30 before the valve core 30 is opened.

According to the preferred embodiment, the valve core 30 is generally configured as a cylindrical post 32 extending from the housing 12. This cylindrical post 32 is hollow with an interior thereof defined by a throat 34 near a tip of the cylindrical post 32 and a wider chamber below the throat 34. The valve 35 resides within this chamber primarily. The valve 35 includes a head 36 which extends up through the throat 34 and has a width similar to that of the throat 34. The valve 35 also includes a flange 37 below the head 36 which is sufficiently large that it cannot pass through the throat 34. The flange 37 thus keeps the valve 35 within the chamber. A tail 38 of the valve 35 extends further down into the chamber opposite the head 36.

A spring 39 is also located within the chamber and on a side of the flange 37 opposite the head 36 and throat 34. The spring 39 thus biases the valve 35 towards a position where the head 36 is within the throat 34 with the valve 35 closed. A seal is preferably provided between the flange 37 and the throat 34 to preclude leakage around the head 36 within the throat 34. When the head 36 is depressed and the spring 39 compressed, air (or other fluids) can pass through the throat 34 and around the head 36 which has been depressed down into the chamber below the throat 34. Such depression of the head 36 can occur either by action of some mechanical structure pressing on the head 36 or can merely occur when sufficient pressure is encountered to cause the spring 39 to be compressed and the valve 36 to move. This form for the valve core 30 shown in FIG. 1 could be modified to be in the form of other fluid inlet parts with values thereon, such as a standard Schraeder valve core.

Within the housing 12, preferably a junction 40 is provided which specifically provides for convenient communication between the receiver 20, the valve core 30 and the Bourdon tube 50. This junction 40 preferably includes three paths including a tire path 42 leading to the receiver 20, a fill path 44 leading to the valve core 30 and a sensor path 46 leading to the Bourdon tube 50. Should the invention be provided in a simplified form where no valve core 30 is provided, the junction 40 would be simplified to eliminate the fill path 44.

Figure 2:
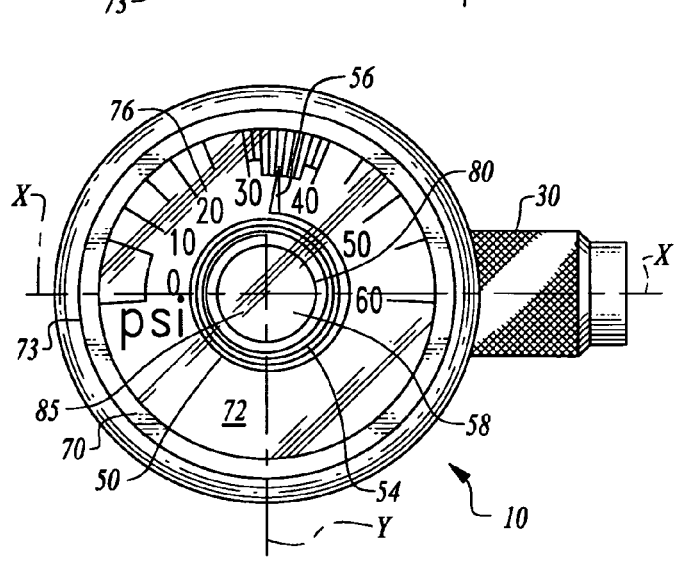
FIG. 2 is a front elevation view of that which is shown in FIG. 1 and showing details of a face of the gauge and further details of the Bourdon tube within the gauge.

With particular reference to FIGS. 1 and 2, details of the Bourdon tube 50 and sensor chamber 60 are described according to a preferred embodiment. The Bourdon tube 50 provides a preferred form of pressure sensor for this invention. As Bourdon tubes 50 are well known in the art, the description of the Bourdon tube 50 of this invention is limited to important details thereof which are impacted by the configuration of this invention.

The Bourdon tube 50 includes a post 52 extending axially from the sensor path 46 adjacent the junction 40 within the housing 12 of the gauge 10. The post 52 extends out into the sensor chamber 60 in which a remainder of the Bourdon tube 50 is located. At a tip of the post 52, the Bourdon tube 50 is bent into a plane perpendicular to the post 52. The Bourdon tube 50 then curves and extends radially a short distance before curving as a coil 54 on a helical path with a plurality of turns, typically four or more, until the Bourdon tube 50 terminates at sensor tip 56.

Typically, an arrow or other pointer is coupled to the Bourdon tube 50 at the sensor tip 56. A central opening 58 defines a space around the post 52 and surrounded by an innermost turn of the coil 54 of the Bourdon tube 50. Most preferably, the central opening 58 has a diameter similar to half or more of an overall diameter of the Bourdon tube 50 defined by an outermost turn of the Bourdon tube 50. The only portion of the Bourdon tube 50 within the central opening 58 is the post 52 and that portion of the Bourdon tube 50 extending from the post 52 to a first turn of the coil 54.

The sensor chamber 60 is generally cylindrical in form and larger than the Bourdon tube 50 to keep the Bourdon tube 50 from touching walls of the sensor chamber 60, most preferably. The sensor chamber 60 is bounded by a floor 62 which is preferably substantially planar and perpendicular to a direction in which the entire gauge 10 faces when being read by a user. A side wall 64 is preferably cylindrical and extends generally perpendicularly from a perimeter of the floor 62. This side wall 64 extends out to a rim 66 which is circular in form and defines the portion of the sensor chamber 60 most distant from the floor 62. The rim 66 preferably includes a step 68 therein where the rim 66 jogs slightly outwardly so that the side wall 64 has a slightly greater diameter beyond the step 68 than it has at the rim 66 and on a side of the step 68 closer to the floor 62.

Figure 3:
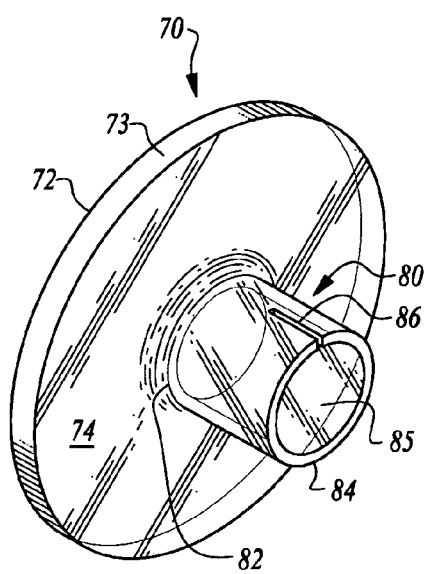
FIG. 3 is a perspective view of the lens of the gauge of FIGS. 1 and 2, taken primarily from the rear.

With particular reference to FIGS. 1-3, details of the lens 70 and associated shroud 80 are described according to a preferred embodiment. The lens 70 is preferably provided to enclose (and typically seal) the sensor chamber 60 and to protect the Bourdon tube 50. The lens 70 is preferably formed of a transparent material or an at least partially transparent material, so that portions of the Bourdon tube 50, and particularly the sensor tip 56, can be seen through the lens 70. For instance, the lens 70 can be formed from a translucent plastic material. The lens 70 has a face 72 defining a side thereof which is viewed by a user. A peripheral edge 73 is preferably circular in form and bounds a perimeter of the face 72. This peripheral edge 73 has a diameter which allows it to rest upon the step 68 so that the lens 70 can be securely mounted to the sensor chamber 60. A rear surface 74 is provided opposite the face 72.

Indicia 76 can be printed upon the lens 70 for alignment with the sensor tip 56 of the Bourdon tube 50 so that correct pressure readings can be made. The indicia 76 can include both graduation lines extending radially from a center of the lens 70 and numbers indicative of pressures that exist when the sensor tip 56 of the Bourdon tube 50 is adjacent the graduation next to the pressure reading number. For instance, the number "40" might be placed next to the graduation which would indicate a pressure of 40 psi should the sensor tip 56 of the Bourdon tip 50 be pointed at this graduation adjacent the number "40" and should the pressure in fact be forty pounds per square inch (psi).

Both Metric and English units can be provided together on the gauge 10 if desired, or only one set of units can be provided if desired. The indicia 76 are calibrated along with the Bourdon tube 50 so that accurate pressure readings are made utilizing the gauge 10.

The indicia 76 are most preferably formed on the rear surface 74 of the lens 70 so that the indicia 76 cannot be inadvertently scratched off of the lens 70. As an alternative, the indicia 76 could be placed upon a card located adjacent the floor 62 of the sensor chamber 60, so that the indicia 76 are located behind the sensor tip 56 of the Bourdon tube 50. While the lens 70 is shown with a flat face 72, the face 72 could have a curving form following various different curves or could be faceted and still function adequately according to this invention.

Most preferably, a shroud 80 (FIG. 3) extends axially from the rear surface 74 and toward the floor 62 of the sensor chamber 60. This shroud 80 is preferably cylindrical in form with a diameter similar to a diameter of the central opening 58 of the Bourdon tube 50. The shroud 80 includes a root 82 adjacent the rear surface 74 and a tip 84 opposite the root 82. The shroud 80 is preferably shaped as a cylindrical wall between the root 82 and tip 84. The shroud 80 preferably includes a substantially hollow interior 85. Also, a slit 86 is formed in at least a portion of the shroud 80 extending from the tip 84 at least partially toward the root 82 at one point along the shroud 80. This shroud 80 can thus extend into the central opening 58 of the Bourdon tube 50 with an innermost turn of the coil 54 of the Bourdon tube 50 adjacent an outer surface of the shroud 80. The slit 86 allows a portion of the Bourdon tube 50 to extend from the post 52 through the slit 86 and out of the interior 85 of the shroud 80, so that the coil 84 of the Bourdon tube 50 is outside of the shroud 80, but adjacent the shroud 80.

The shroud 80 is a preferred form of a support wall or other structure to support the Bourdon tube 50, especially when centrifugal forces of the tire place lateral loads on the Bourdon tube 50. Other structures than the shroud 80 could be utilized to support the Bourdon tube 50 within the central opening 58 of the Bourdon tube 50, either extending from the lens 70, from the floor 62 or some other support. When the Bourdon tube 50 encounters these forces and tends to be bent away from a central axis of the Bourdon tube 50, the coil 54 impacts portions of the shroud 80 and substantially stops bending. These forces against the shroud 80 are absorbed by the entire housing 12 of the gauge 10 and by the receiver 20 mounted upon the valve stem 2. Thus, the Bourdon tube 50 cannot bend significantly and an elastic limit of materials forming the Bourdon tube 50 is not exceeded and de-calibration of the gauge 10 is prevented. Thus, when the tire ceases rotation or other forces come to an end (i.e. encountering bumps in the road or various vibration forces), the Bourdon tube 50 has not encountered any damage and continues to maintain a reading of accurate pressure for the tire.

In addition, a somewhat peculiar phenomenon is believed to occur, for at least some gauge 10 and valve stem 2 coupling orientations, that makes the shroud 80 particularly beneficial. The rotating tire and valve stem 2 can impart a somewhat centrifugal force on the Bourdon tube 50. Because the Bourdon tube 50 is of light thin walled material, this centrifugal force causes the Bourdon tube 50 to either tend to coil "tighter" into a lesser diameter spiral or to uncoil "looser" into a greater diameter spiral. Without the shroud 80, either change under load can take the Bourdon tube 50 past its elastic limit (or induce creep), causing the Bourdon tube 50 to be de-calibrated or destroyed altogether. Most preferably, the Bourdon tube 50 is selected to spiral in a direction that makes it coil "tighter" when mounted to the tire and the shroud 80 is provided as shown in FIGS. 1-3. The Bourdon tube 50 thus spirals tightly against the shroud 80, and the shroud 80 supports the Bourdon tube 50, preventing further damage. Note that gauges 10 on opposite sides of a vehicle would need Bourdon tubes 50 spiraling in opposite directions to provide proper performance along with the shroud 80. The gauges 10 could be marked "left" or "right" to simplify proper installation.

With particular reference to FIG. 7, details of an alternative gauge 110, according to an alternative embodiment, are described. With this alternative gauge 110, only the unique features thereof have been identified with unique reference numerals. An alternative Bourdon tube 150 is provided where the Bourdon tube 150 is supported from through the floor of the alternative sensor chamber 160 rather than from the lens 70 (FIG. 1) as with the preferred embodiment. The central cylindrical tower 152 has a hollow interior which receives the pressurized fluid therein. The alternative Bourdon tube 150 is mounted to a hole in a lateral side of the central cylindrical tower 152. The alternative Bourdon tube 150 is wrapped around this central cylindrical tower 152 with an innermost turn of the alternative Bourdon tube 150 adjacent the central cylindrical tower 152. Thus, the coil 154 of the alternative Bourdon tube 150 is supported by the central cylindrical tower 152 to prevent damage from excessive forces, as described above.

The central cylindrical tower 152 can be provided as a portion of the alternative Bourdon tube 150 or can be provided separately and the alternative Bourdon tube 150 mounted to the central cylindrical tower 152. The central cylindrical tower 152 is provided with sufficient strength to resist the forces, including centrifugal forces, encountered by the alternative gauge 110 when it remains mounted upon the tire (or other compressed fluid reservoir) during rotation and when other forces are encountered.

For instance, the central cylindrical tower 152 can be formed with a thicker wall than walls forming the alternative Bourdon tube 150 so that it can greater resist the forces of this environment. As another alternative, the central cylindrical tower 152 can be formed of a material having greater hardness and/or strength characteristics so that the central cylindrical tower 152 is better able to withstand the forces associated with the environment. A combination of elevated material strength and greater wall thickness could also alternatively be utilized to provide the necessary strength within the central cylindrical tower 152, so that it does not encounter a damaging level of bending loads when forces, including centrifugal forces, are encountered by the alternative gauge 110.

Also in this alternative gauge 110, an alternative sensor chamber 160 and alternative lens 170 are described. The alternative sensor chamber 160 and alternative lens 170 could optionally also be provided with the embodiment of FIG. 1 if desired. In particular, the alternative sensor chamber 160 includes a rim 166 with a groove 168 adjacent thereto and facing radially outwardly. The alternative lens 170 includes a peripheral edge 173 which has a diameter similar to an outer diameter of the alternative sensor chamber 160. A ring 175 extends axially from the peripheral edge 173 of the alternative lens 170. A tooth 177 on the ring 175 extends radially toward a centerline of the alternative lens 170 slightly. A contour of the tooth 177 is similar to a contour of the groove 168 in the rim 166 of the alternative sensor chamber 160. Thus, the entire alternative lens 170 can snap over the alternative sensor chamber 160 with the tooth 177 snapping into the groove 168 to secure the alternative lens 170 onto the alternative sensor chamber 160. Typically, an adhesive is also provided to secure and seal the lens 170 (and the lens 70 to the housing 12.

With particular reference to FIGS. 1, 2 and 4-10, various different alternative relative orientations for the valve core 30, receiver 20 and facing direction of the lens 70 and sensor chamber 60 for the gauge 10 and alternative gauge 110 are described. In each of these embodiments, the valve stem 2 is oriented along a Z axis. Thus, in the embodiment of FIG. 1, the lens 70 also faces axially along the Z axis. The valve core 30 is shown perpendicular to the Z axis and extending along the X axis. As shown by arrow B, it is not necessary that the receiver 20 be oriented perpendicular to the centerline of the valve core 30 and inline with the centerline of the lens 70. Rather, the receiver 20 could be angled less than or greater than 90° away from the X axis aligned with the valve core 30.

Figures 4, 5, 6:
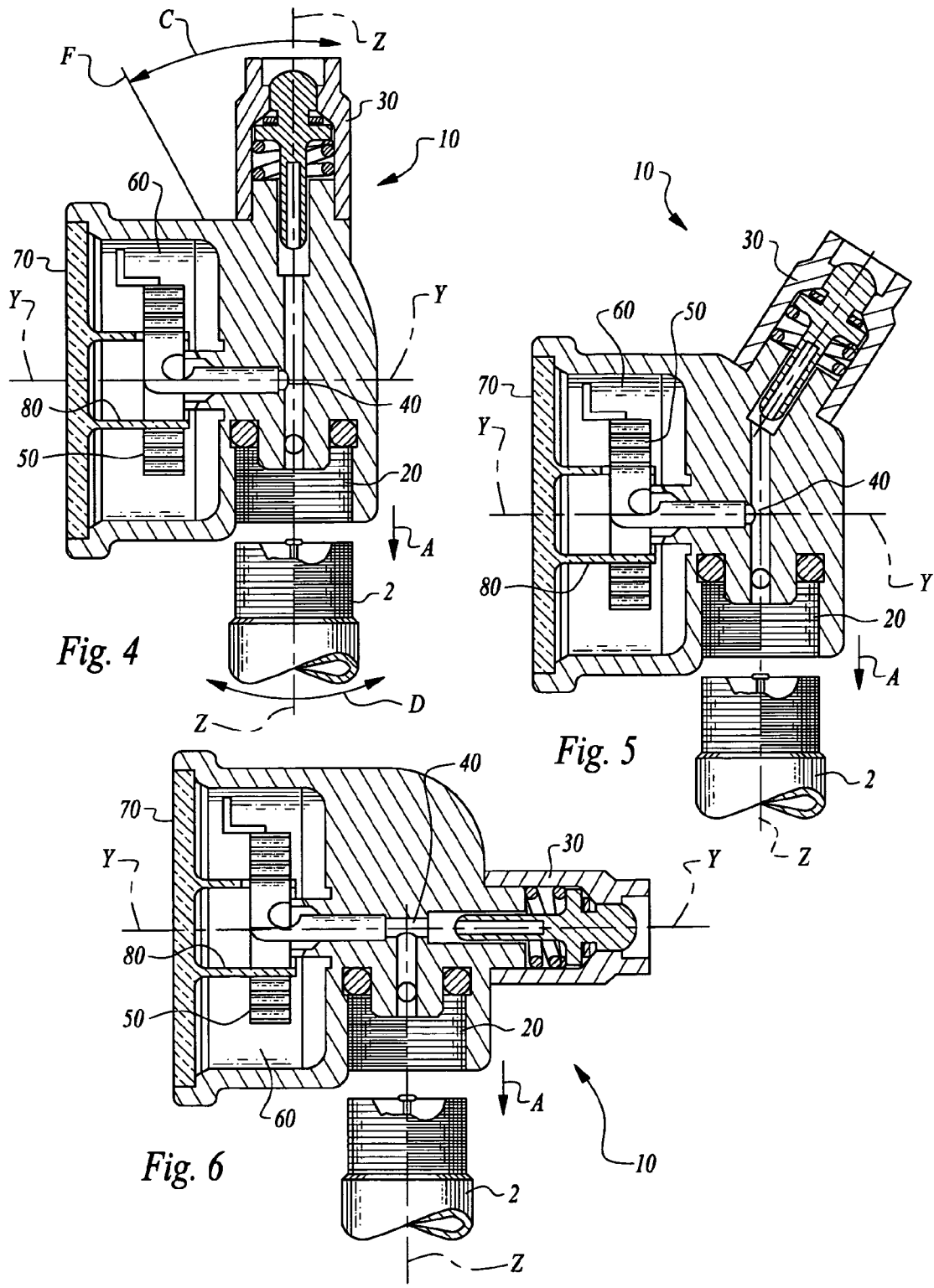
FIGS. 4-6 are full sectional views of the gauge of FIG. 1, but with the receiver and valve core oriented differently relative to the gauge face and each other to illustrate how the gauge can take on different geometries according to this invention to accommodate different face orientations and valve core orientations when the gauge is mounted upon a valve stem of a tire or other reservoir of compressed fluid.

With particular reference to FIGS. 4-6 further alternatives are shown. In particular, FIG. 4 shows an embodiment where the receiver 20 is aligned with the Z axis and the valve core 30 is also aligned with the Z axis, inline with the receiver 20 but facing in an opposite direction. In this embodiment, the lens 70 faces along a Y axis perpendicular to the Z axis. Note from FIG. 4 that arrow C illustrates how the valve core 30 could be angled such as toward a forward swept axis F or away from this forward swept axis F so that it extends partially away from the lens 70 (see FIGS. 5 and 6). Similarly, the receiver 20 could also be angled either toward the Y axis with which the lens 70 faces or away from this Y axis.

FIGS. 7-10 generally illustrate how similar modifications could be provided for the alternative gauge 110. In FIG. 11, a variation on the embodiment shown in FIG. 8 is provided. In this embodiment the receiver 20 is aligned with the Z axis and the face of the lens 70 is aligned with the Y axis (FIG. 8), but the valve core 30 has been rotated (along arrow E of FIG. 11) to be oriented aligned with an X axis perpendicular to both the Z axis (FIG. 11) and perpendicular to the Y axis (FIG. 8). Thus, in this embodiment of FIG. 11, the receiver 20, the valve core 30 and a centerline of the lens 70 are each mutually perpendicular to each other. Note that while these particular embodiments have been shown in these FIGS., various different intermediate positions could be provided, with the embodiments shown merely being illustrative of the flexibility with which the valve core 30, receiver 20 and sensor chamber 60 and lens 70 can be oriented to maximize convenience for viewing of the lens 70 and associated Bourdon tube 50 sensor tip 56, as well as maximum convenience in accessing the valve core 30.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. For instance, the indicia 76 and/or the sensor tip 56, or related portions of the sensor chamber 60 can be illuminated either to enhance visibility in low light conditions or to indicate a warning condition, such as a low pressure being sensed. This illumination could be in the form of photoluminescent materials applied to the indicia 76 (or elsewhere), such as those which are charged by having light incident thereon and then emit light so that they "glow-in-the-dark" for visibility (such as in the evening), or can be coatings which are formed from a substance which is phosphorescent, chemluminescent, or otherwise exhibits luminosity.

Alternatively, powered lights could be provided. In such powered light configurations, some form of power supply (i.e. a battery) would be provided along with a simple electric circuit coupled to a light source. This light source could be an LED, a small incandescent light bulb, or some other form of powered light source. Typically with this powered light source embodiment, some form of switch would be provided to turn on the light when viewing is desired. This switch could be manually toggleable and mounted on the housing or could be a wireless switch (i.e. such as could be on a key chain as a key fob with a button thereon and a wireless transmitter transmitting to a receiver on the gauge 10). A user would depress the button when it is desired that the gauge 10 be read in low light conditions.

Furthermore, such a powered light circuit could be coupled to a pressure transducer which appropriately alters the circuit so that the circuit is closed and light is emitted from the light source when a sufficiently low pressure is detected that a danger (or merely sub-optimal performance) is present. For instance, the light could have a red blinking mode when such a low pressure condition is sensed so that a driver of the vehicle would notice the flashing red light on the tire that has the gauge 10 mounted thereon and be warned of the low pressure condition. If desired, two separate light sources and separate light circuits could be provided with one of the light sources being provided for illumination and reading of the gauge 10 and with the other light source coupled to a circuit provided to indicate a warning condition. Alternatively, a single light could function for both of these purposes.

When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A pressure gauge, the gauge comprising in combination:
   a receiver adapted to be coupled to a valve stem of a fluid containing structure, such as a vehicle tire;
   said receiver adapted to be in communication with fluid inside the fluid containing structure when said receiver is coupled to the valve stem of the fluid containing structure;
   a Bourdon tube having a plurality of turns around a central opening, said Bourdon tube having an interior communicating with said receiver;
   indicia adjacent said Bourdon tube, said Bourdon tube calibrated to facilitate accurate pressure reading by comparing an orientation of said Bourdon tube with said indicia;
   a support wall oriented within said central opening of said Bourdon tube; and
   wherein said support wall is free from attachment to said Bourdon tube.

2. The gauge of claim 1 wherein said Bourdon tube resides within a sensor chamber of said gauge, said gauge including a lens covering said sensor chamber, said support wall coupled to said lens.

3. The gauge of claim 1 wherein said support wall includes a cylindrical shroud extending substantially perpendicularly from said lens and into said central opening of said Bourdon tube.

4. The gauge of claim 3 wherein said cylindrical shroud includes a slit passing therethrough, said slit sufficiently wide to allow said Bourdon tube to pass therethrough between a central post of said Bourdon tube and a coil of said Bourdon tube.

5. The gauge of claim 1 wherein said support wall is rigidly coupled to said gauge.

6. The gauge of claim 1 wherein said Bourdon tube is located within a sensor chamber of said gauge, said sensor chamber including a floor defining an innermost portion of said sensor chamber and a lens opposite said floor and enclosing said Bourdon tube within said sensor chamber, said support wall extending from said floor at least partially toward said lens.

7. A pressure gauge, the gauge comprising in combination:
   a receiver adapted to be coupled to a valve stem of a fluid containing structure, such as a vehicle tire;
   said receiver adapted to be in communication with fluid inside the fluid containing structure when said receiver is coupled to the valve stem of the fluid containing structure;
   a Bourdon tube having a plurality of turns around a central opening, said Bourdon tube having an interior communicating with said receiver;
   indicia adjacent said Bourdon tube, said Bourdon tube calibrated to facilitate accurate pressure reading by comparing an orientation of said Bourdon tube with said indicia;
   a support wall oriented within said central opening of said Bourdon tube;
   wherein said support wall is free from attachment to said Bourdon tube;
   wherein said support wall is rigidly coupled to said gauge;
   wherein said Bourdon tube is located within a sensor chamber of said gauge, said sensor chamber including a floor defining an innermost portion of said sensor chamber and a lens opposite said floor and enclosing said Bourdon tube within said sensor chamber, said support wall extending from said floor at least partially toward said lens; and
   wherein said support wall includes a substantially rigid tower, said tower having a hollow interior.

8. The gauge of claim 7 wherein said Bourdon tube is coupled to an opening in said tower with said hollow interior of said tower in communication with said receiver of said gauge, such that said Bourdon tube is in communication with said receiver of said gauge through said tower.

9. A pressure gauge, the gauge comprising in combination:
   a receiver adapted to be coupled to a valve stem of a fluid containing structure, such as a vehicle tire;
   said receiver adapted to be in communication with fluid inside the fluid containing structure when said receiver is coupled to the valve stem of the fluid containing structure;
   a Bourdon tube having a plurality of turns around a central opening, said Bourdon tube having an interior communicating with said receiver;
   indicia adjacent said Bourdon tube, said Bourdon tube calibrated to facilitate accurate pressure reading by comparing an orientation of said Bourdon tube with said indicia;
   a support wall oriented within said central opening of said Bourdon tube; and
   wherein a centerline of said receiver is oriented substantially opposite a centerline of said Bourdon tube, such that said Bourdon tube faces away from said receiver.

10. A pressure gauge, the gauge comprising in combination:
   a receiver adapted to be coupled to a valve stem of a fluid containing structure, such as a vehicle tire;
   said receiver adapted to be in communication with fluid inside the fluid containing structure when said receiver is coupled to the valve stem of the fluid containing structure;
   a Bourdon tube having a plurality of turns around a central opening, said Bourdon tube having an interior communicating with said receiver;

indicia adjacent said Bourdon tube, said Bourdon tube calibrated to facilitate accurate pressure reading by comparing an orientation of said Bourdon tube with said indicia;

a support wall oriented within said central opening of said Bourdon tube; and wherein said gauge includes a valve core with a fill path in communication with both said valve core and said receiver, said valve core including a valve therein which is biased towards a closed position, said valve core adapted to allow fluid to pass through said gauge, through said receiver and into the fluid containing structure without requiring removal of the gauge from the valve stem of the fluid containing structure.

11. The gauge of claim 10 wherein said valve core is oriented with a centerline substantially perpendicular to a centerline of said Bourdon tube.

12. The gauge of claim 10 wherein said valve core is oriented with a centerline substantially in line with a centerline of said Bourdon tube.

* * * * *